US008646100B2

(12) United States Patent
Swingler et al.

(10) Patent No.: US 8,646,100 B2
(45) Date of Patent: Feb. 4, 2014

(54) METHOD FOR EXECUTING AN APPLICATION IN A RESTRICTED OPERATING ENVIRONMENT

(75) Inventors: Michael A. Swingler, Palo Alto, CA (US); Thomas J. O'Brien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/183,820

(22) Filed: Jul. 15, 2011

(65) Prior Publication Data

US 2012/0311697 A1   Dec. 6, 2012

Related U.S. Application Data

(60) Provisional application No. 61/493,271, filed on Jun. 3, 2011.

(51) Int. Cl.
*G06F 21/00* (2013.01)

(52) U.S. Cl.
USPC .................... 726/27; 726/16; 726/17; 726/26

(58) Field of Classification Search
USPC ............................................ 726/1, 2, 16–17
See application file for complete search history.

(56) References Cited

U.S. PATENT DOCUMENTS

| | | | |
|---|---|---|---|
| 6,317,742 B1 * | 11/2001 | Nagaratnam et al. | 1/1 |
| 6,516,416 B2 * | 2/2003 | Gregg et al. | 726/8 |
| 6,948,183 B1 | 9/2005 | Peterka | |
| 7,185,047 B1 * | 2/2007 | Bate et al. | 709/202 |
| 7,207,064 B2 * | 4/2007 | Fee et al. | 726/14 |
| 7,237,119 B2 | 6/2007 | Clark et al. | |
| 7,823,186 B2 | 10/2010 | Pouliot | |
| 7,930,539 B2 | 4/2011 | Soltis, Jr. et al. | |
| 8,046,831 B2 * | 10/2011 | Porter et al. | 726/22 |
| 2004/0230835 A1 * | 11/2004 | Goldfeder et al. | 713/201 |
| 2006/0075464 A1 * | 4/2006 | Golan et al. | 726/1 |
| 2008/0189793 A1 | 8/2008 | Kirkup | |
| 2009/0216979 A1 | 8/2009 | Balasubramanian et al. | |
| 2009/0222925 A1 * | 9/2009 | Hilaiel et al. | 726/25 |
| 2010/0287598 A1 * | 11/2010 | Korkishko et al. | 726/1 |

OTHER PUBLICATIONS

SDDL (http://networkadminkb.com/KB/a152/how-to-read-a-sddl-string.aspx, dated year 2009), printed out in year 2012.*

* cited by examiner

*Primary Examiner* — Linglan Edwards
(74) *Attorney, Agent, or Firm* — Kilpatrick Townsend & Stockton LLP (57) ABSTRACT

A user is presented with one or more user-level permissions in a human understandable language, where the one or more user-level permissions represent one or more application-level permissions requested from an application for accessing one or more resources. A security profile is generated having one or more operating system (OS)-level permissions based on at least one of the user-level permissions authorized by the user. The security profile is enforced to restrict the application to accessing the one or more resources based on the OS-level permissions.

16 Claims, 8 Drawing Sheets

```
<html>
  ...
  <applet>
    ...
    <code>
      ...
    </code>
    ...
    <sandbox>       ← 301
      ...
      <required permissions>  ⎫
      ...                     ⎬ 302
      </required permissions> ⎭
      ...
      <optional permissions>  ⎫
      ...                     ⎬ 303
      </optional permissions> ⎭
      ...
    </sandbox>
    ...
  </applet>
  ...
</html>
```

METHOD FOR EXECUTING AN APPLICATION IN A RESTRICTED OPERATING ENVIRONMENT

RELATED APPLICATIONS

This application claims the benefit of U.S. Provisional Patent Application No. 61/493,271 filed Jun. 3, 2011, which is incorporated by reference herein in its entirety.

FIELD OF THE INVENTION

Embodiments of the present invention relate generally to the field of secure computing. More particularly, embodiments of the invention relate to configuring an application to be executed in a restricted operating environment.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses", "worms", "Trojan horses", "spyware", "adware", and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

When an application is to be executed, a user may be prompted whether the execution of the application should be allowed or denied entirely. There is a lack of efficient way to configure in a finer-grained fashion whether a particular action to be performed by the application is allowed. In addition, a permission to allow an application to perform a particular action is typically configured at a low level such as an operating system (OS) level that is not human understandable. There has been a lack of mechanism to convey permission information to a user at a higher level that is human understandable.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to help a user to conveniently select what permissions the user wishes to grant to executable code such as an application, an applet, or an application plugin. Permissions requested by an application (also referred to as application-level permissions) are translated into higher level human understandable user-level permissions. The user-level permissions are presented to the user as one or more permission blocks, where a permission block is a high level concept which enables a user-comprehensible function, such as the ability to print a document, open a document, etc. Permission blocks are made up of OS-level permissions that are needed to provide the user functionality (e.g., read access on a directory, on a file, etc.)

When the application is to be launched, or a plug-in is to be loaded, a request for permissions is made by the appropriate loader, and the user is notified of user-level permissions representing the requested application-level permissions. In response to user inputs representing authorization to grant or deny some or all of the presented user-level permissions, OS-level permissions are generated based on the granted user-level permissions. A security profile is generated based on the granted OS-level permissions and the security profile is enforced during execution of the application to restrict the application accessing resources permitted by the OS-level permissions of the security profile. As a result, the user is presented with useful and understandable information concerning what permissions have been granted to the application without having to understand the application-level and/or OS-level permissions.

Figure 1:
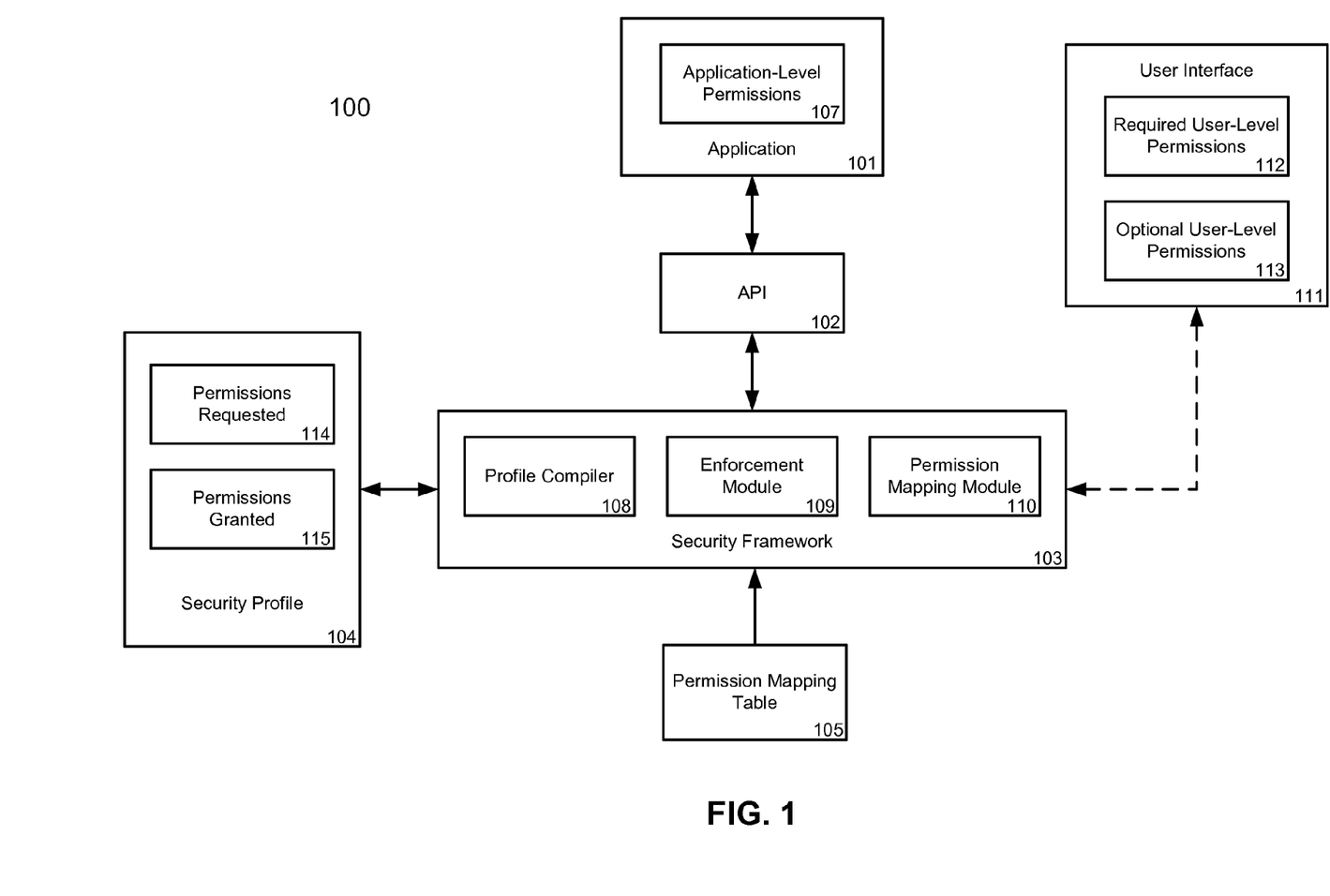
FIG. 1 is a block diagram illustrating a system for restricting an application in a restricted operating environment according to one embodiment of the invention.

FIG. 1 is a block diagram illustrating a system for restricting an application in a restricted operating environment according to one embodiment of the invention. System 100 can represent any of computing device or system, such as a desktop, laptop, server, tablet, personal digital assistant (PDA), mobile phone, set-top box, media player, or gaming device, etc. Referring to FIG. 1, system 100 includes application 101 communicatively coupled to security framework 103 via application programming interface (API) 102. Note that although one application as a client is shown, for illustration purpose only, more clients may also be coupled to security framework 103. In one embodiment, security framework 103 may be implemented as a system component of an operating system, which may be any kind of operating systems, such as iOS™ or Mac OS X™ from Apple Inc. of Cupertino, Calif., a Windows™ operating system from Microsoft Corporation of Redmond, Wash., or alternatively a LINUX or UNIX operating system. For example, security framework 103 may be implemented as part of a sandbox management unit running within a kernel of the operating system, where the sandbox management unit is configured to restrict an application to be executed within a restricted operating environment, for example, based on a security profile associated with the application. An application is only entitled to access a resource that is implicitly allowed, explicitly granted, or otherwise specified in the security profile of the application.

API 102 may be implemented as a system API to allow any of client applications such as application 101 to communicate with security framework 103. Application 101 can be any kind of application such as a standalone application. Alternatively, application 101 may be a plug-in application or applet that is hosted within another application. For example, application 101 may be a Java™ applet embedded within a Web page hosted or processed by a browser application, where the Web page may be downloaded from a variety of information or service provider servers such as Web servers. In this example, a Java applet communicates with the browser application via a corresponding agent or plug-in (e.g., Java plug-in), where the browser application communicates with security framework 103 via a system API (e.g., API 102). Some applets may include photo uploaders and picture takers, interactive maps that show a user's real-time location, or collaborative document editors.

In one embodiment, application 101 includes information describing one or more permissions requested and/or required by application 101, referred to herein as application-level permissions 107. Application-level permissions 107 refer to the permissions requested by application 101 for accessing one or more resources of system 100 during execution of application 101. Application-level permissions 107 may be specified by a developer or administrator of application 101. Application-level permissions 107 are typically specified in a format that is compatible with the API 102 in a programming language of application 101. Application-level permissions 107 may or may not be described in a human understandable manner.

In one embodiment, application-level permissions 107 include a first portion of one or more permissions that are required by application 101 and a second portion of one or more permissions that are optionally required by application 101 during execution of application 101. That is, the required permissions represent the permissions an application needs in order to perform its basic functions. An example of such a required permission for an application such as a photo editor application includes a permission to access files in the user's home directory on the file system. The optional permissions represent those permissions the application would benefit from having, but whose absence will still allow the application to perform its basic functions. An example of such an optional permission is a permission to print a picture. As another example, an instant messaging application would require access to connect over a network to an instant messaging server, but would optionally request access to the system's microphone and camera.

Figure 3:
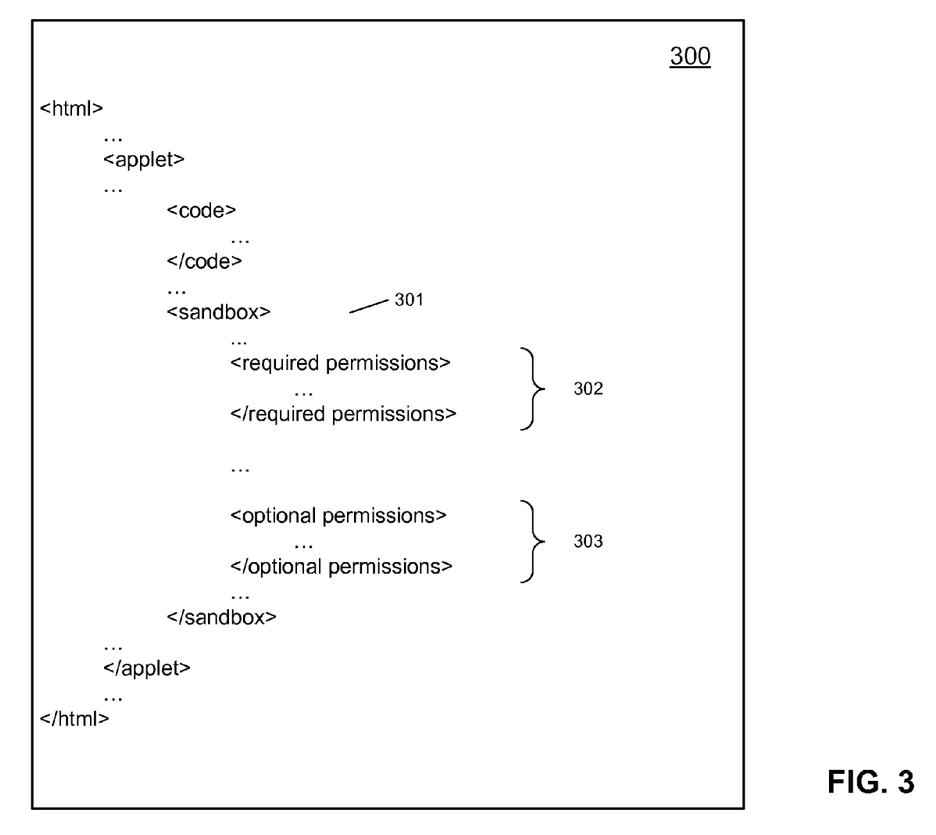
FIG. 3 is an example of a hypertext mark-up language (HTML) script representing a Web-based application such as a Java applet.

In one embodiment, application-level permissions 107 may be embedded within the source code of an application or as metadata of the application. FIG. 3 is an example of a hypertext mark-up language (HTML) script representing a Web-based application such as a Java applet. Script 300 includes a security tab 301 having zero or more required permissions 302 and zero or more optional permissions 303 requested by application 303. Permissions 302-303 may be specified or programmed by a developer of application 300. Note that the format as shown in FIG. 3 is described in view of an HTML application. The formats may be different for other types of programming languages.

Referring back to FIG. 1, according to one embodiment, when application 101 is to be loaded, an application loader that is responsible for loading application 101 (not shown) is configured to extract metadata representing application-level permissions 107 from application 101, including determining the required application-level permissions and optional application-level permissions requested by application 101. As described above, application 101 can be a standalone application which may be loaded by an application loader of an operating system. Alternatively, application 101 can be an applet (e.g., Java applet) hosted by a hosting application (e.g., browser). In this situation, a plug-in of the hosting application is responsible for loading application 101.

In one embodiment, prior to loading application 101, the application loader is configured to determine whether the requested permissions are to be granted by the system. Application 101 may only be loaded if at least the required application-level permissions are granted. In one embodiment, in response to a request to load application 101, the application loader is configured to extract and transmit application-level permissions 107 to security framework 103 via API 102. Based on application-level permissions 107, permission mapping module 110 is configured to map the application-level permissions to user-level permissions using permission mapping table 105. The mapped user-level permissions are then presented to a user via user interface 111, including zero or more required user-level permissions 112 and zero or more optional user-level permissions 113. In one embodiment, the user-level permissions are described in human or user understandable language, images, iconography, or other representation such that when presented to a user, the user can easily understand what permissions are being sought by the application, without having to understand the low level application-level permissions and/or OS-level permissions used by the application developers or the operating system.

Figure 2:
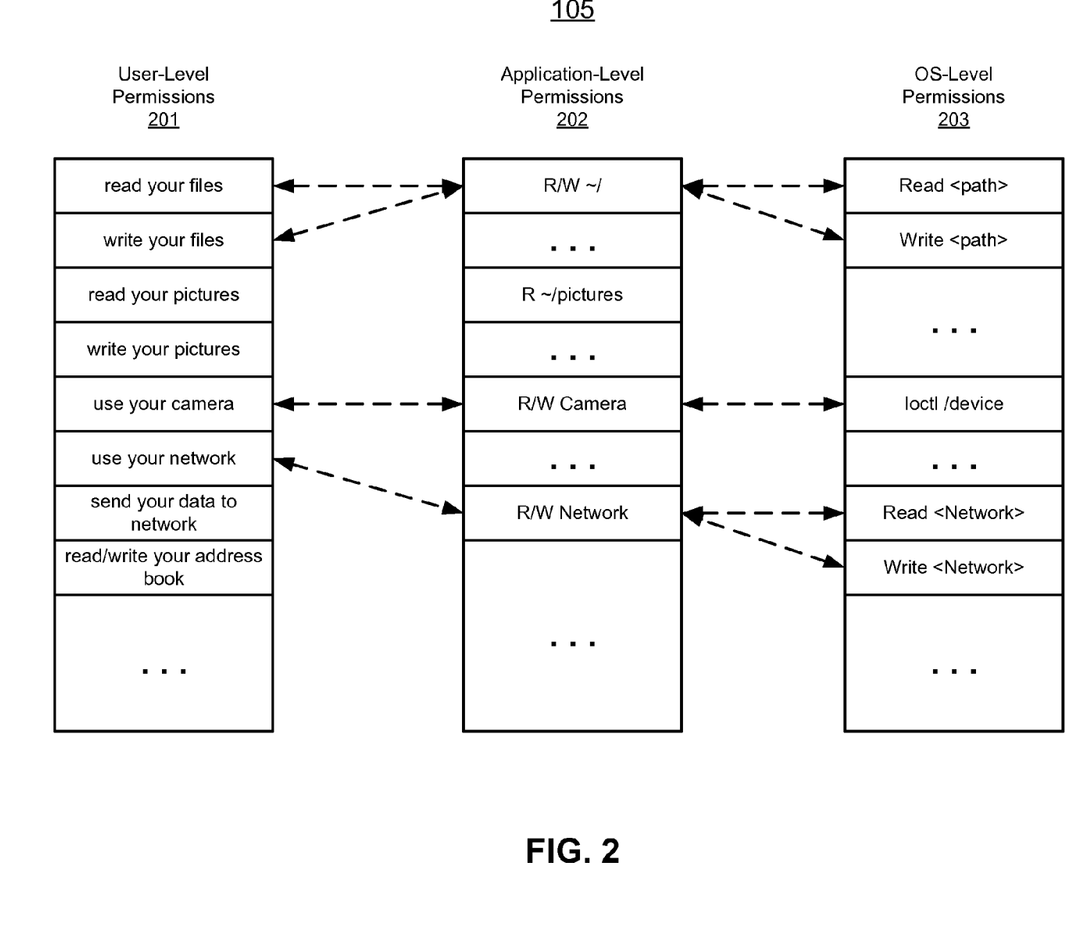
FIG. 2 is a diagram illustrating an example of a permission mapping data structure according to one embodiment of the invention.

FIG. 2 is a diagram illustrating an example of a permission mapping data structure according to one embodiment of the invention. Referring to FIG. 2, permission mapping data structure 105 includes user-level permissions 201, application-level permissions 202, and OS-level permission 203, which may be defined according to a set of rules or definitions. The mapping of different permissions 201-203 can be implemented in a variety of ways. According to one embodiment, for each of application-level permissions 202, data structure 105 is maintained in a manner that one can search and find one or more corresponding user-level permissions from user-level permissions 201 and one or more corresponding OS-level permissions from OS-level permissions 203, or vice versa.

As can be shown, user-level permissions 201 are described using certain user understandable terms, language, or other expression, while OS-level permissions 203 may be described in lower level terms (e.g., machine or OS understandable terms) that an ordinary user would have a hard time understanding. Application-level permissions 202 may be specified in a manner dependent upon the specific API and application programming languages. Thus, the formats or terms used in application-level permissions may be different for different APIs and programming languages. In one embodiment, different APIs or programming languages may use different permission mapping tables or data structures.

Referring back to FIG. 1, according to one embodiment, based on application-level permissions 107 requested by application 101, permission mapping module 110 is configured to convert the application-level permissions to user-level permissions using permission mapping table 105 and present the user-level permissions to a user via user interface 111 for user authorization. The presented user-level permissions include required user-level permissions 112 and optional user-level permissions 113. From user interface 111, a user can grant or deny some or all of the requested permissions.

Figure 4:
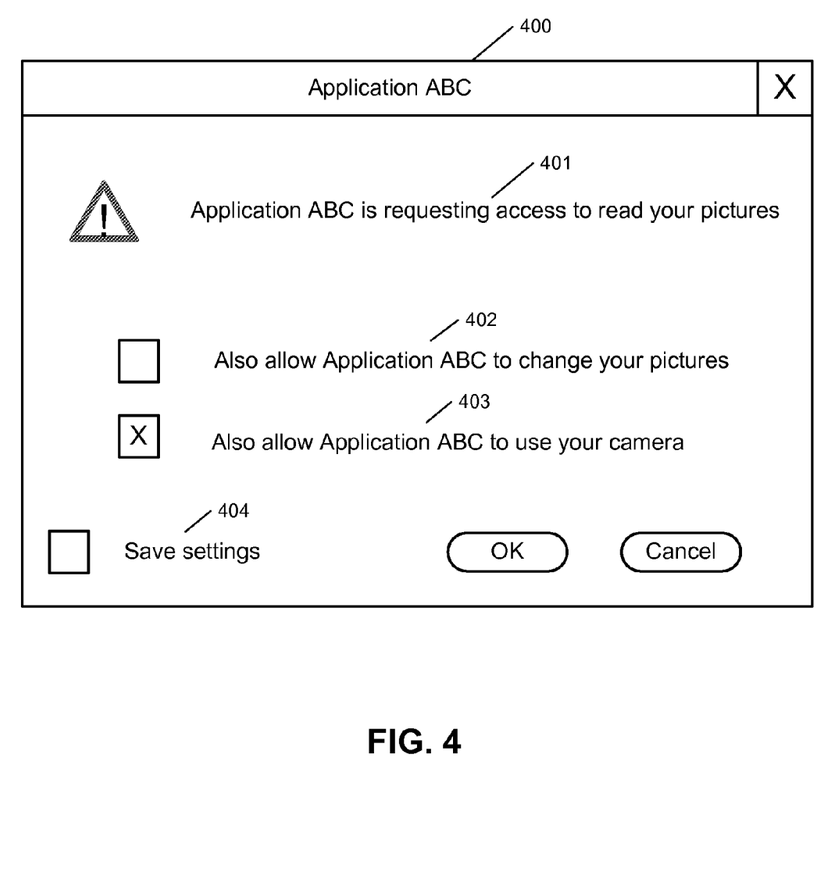
FIG. 4 is a block diagram illustrating an example of a graphical user interface (GUI) according to one embodiment of the invention.

FIG. 4 is a block diagram illustrating an example of a graphical user interface (GUI) according to one embodiment of the invention. For example, GUI 400 may be presented as part of user interface 111 of FIG. 1. Referring to FIG. 4, GUI 400 presented to a user includes zero or more required user-level permissions 401 and zero or more optional user-level permissions 402-403. User-level permissions 401-403 may be converted or mapped from application-level permissions specified by an application to be loaded (e.g., application-level permissions 302-303 of FIG. 3 based on mapping table 105 of FIG. 2). In this example, the user-level permission of "read your pictures" may be converted from an application-level permission of "r~/pictures" based on mapping table 105 of FIG. 2. Similarly, the user-level permission of "use your camera" may be converted from an application-level permission of "r/w camera" based on mapping table 105 of FIG. 2. As a result, an ordinary user can easily understand the permissions of "read your pictures" and "use your camera" rather than "r~/pictures" and "r/w camera."

Note that permissions 402-403 are optional permissions and that without them, the application can still perform its basic functions. A user can optionally grant or deny any of permissions 402-403 via the associated checkboxes, and the application can still function with or without the optional features or functions permitted by optional permissions 402-403. However, if the user denies required permission 401, for example, by clicking the "cancel" button, the application may not function and may be prevented from loading.

According to one embodiment, once the permissions 401-403 have been configured and the user positively confirms the granting of the permissions, for example, by clicking the "OK" button, a security profile is dynamically generated. The security profile includes at least the granted permissions listed in OS-level permissions, which are translated or converted from user-level permissions 401-403. The security profile may also include permissions implicitly granted by the operating system or security manager. The security profile is then used by the OS or a security manager (e.g., sandbox manager) to enforce the permissions set forth in the security profile to limit the associated application operating in a restricted operating environment.

The security profile may be loaded in a system memory (e.g., random-access memory or RAM) and used by the OS. Thus, the security is generated and temporarily loaded for the current instance of the application. Once the application is unloaded, the security profile may be unloaded or erased from the memory. When the same application is loaded again at a future time, the above processes may be performed again and a new profile may be generated for the new instance of the application.

According to one embodiment, an option 404 is provided to allow a user to specify whether the security profile should be saved to a persistent storage location such as a hard drive of the system. The security profile may be stored in an encrypted form or be invisible to the user. If the user enables the option 404, the security profile is stored in a persistent storage location. In this situation, the security framework also maintains a database or table indicating which profile is associated with each application. An application may be identified based on a variety of identifiers or indicators.

Subsequently, when an application is about to be loaded an identifier of the application is used to determine whether a security profile has been previously created and stored in a persistent storage. Several mechanisms can be used to identify the application, including its name, a programmatic identifier inside it's binary or bundle, a code-signing certificate chain used to sign the application, or other criteria. If a previous security profile has been identified, permissions currently requested by the application and the permissions previously granted are compared to determine whether the same or greater requested permissions have been previously granted to the same application. Note that a security profile may include information identifying the permissions previously requested and permissions previously granted.

If the currently requested permissions are different than the previously requested permissions, according to one embodiment, a GUI page such as the one as shown in FIG. 4 may be displayed requesting a user to confirm the authorization of the new permissions requested. In addition, according to one embodiment, if certain optional permissions were previously requested, the GUI page may still be displayed to confirm whether the user wishes to grant the optional permissions this time around. In some situations, a user may have granted an optional permission during a previous execution of the application, but the user may not want to grant the same optional permission in a subsequent execution of the application. The new settings may be updated in the security profile dependent upon whether the user indicates that the new settings should be saved in a persistent security profile. Furthermore, the security profile may be removed or erased from the persistent storage if the user denies all the permissions requested.

Figure 5:
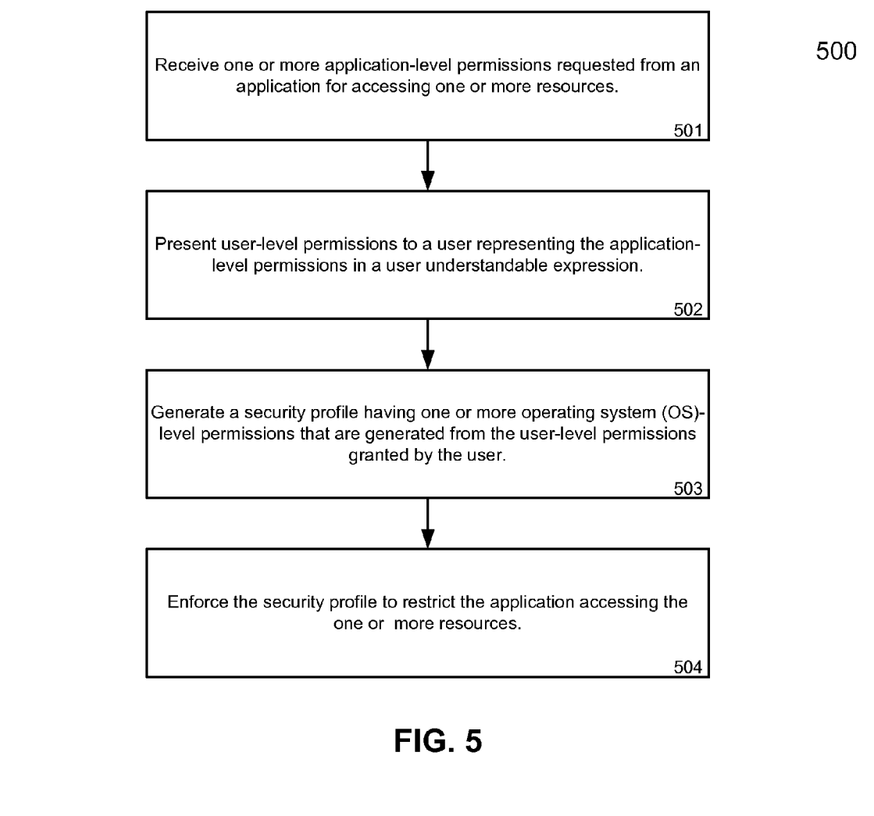
FIG. 5 is a flow diagram illustrating a method for granting permissions of an application according to one embodiment of the invention.

FIG. 5 is a flow diagram illustrating a method for granting permissions of an application according to one embodiment of the invention. Method 500 may be performed by security framework 103 of FIG. 1. Referring to FIG. 5, at block 501, one or more application-level permissions are received which are requested by an application for accessing one or more resources. At block 502, user-level permissions corresponding to the application-level permissions are presented to a user, where the user-level permissions are presented in a user understandable language or manner. For example, the user-level permissions may be presented using a GUI page similar to the one as shown in FIG. 4. The user-level permissions may be converted from the application-level permissions using a permission mapping table that maps application-level permissions to user-level permissions and OS-level permissions. At block 503, a security profile is generated based on the user inputs, where the security profile includes zero or more OS-level permissions generated from zero or more user-level permissions granted by the user. Similarly, the OS-level permissions may be converted from the user-level permissions using the permission mapping table. At block 504, the security profile is enforced to restrict the application accessing the resources. The security profile may also be cached in a persistent storage.

Figure 6:
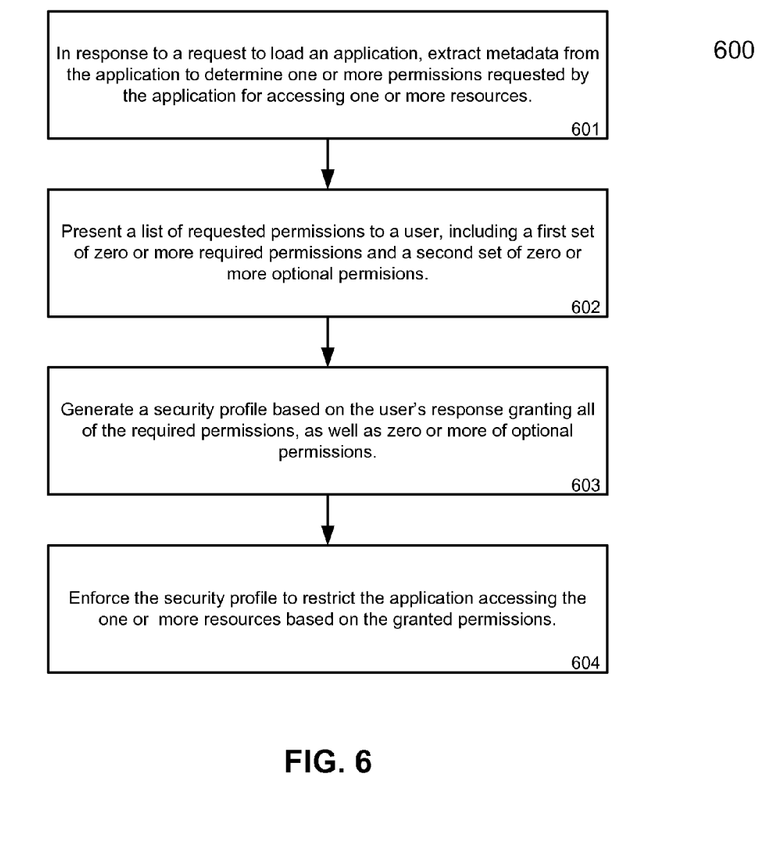
FIG. 6 is a flow diagram illustrating a method for granting permissions of an application according to another embodiment of the invention.

FIG. 6 is a flow diagram illustrating a method for granting permissions of an application according to another embodiment of the invention. Method 600 may be performed by security framework 103 of FIG. 1. Referring to FIG. 6, in response to a request to load an application, at block 601, metadata is extracted from the application to determine zero or more permissions requested by the application for accessing zero or more resources. The metadata includes information identifying application-level permissions requested. At block 602, the requested permissions are presented to a user, including a set of zero or more required permissions, and a second set of zero or more optional permissions. The requested permissions are presented to the user via a GUI page similar to the one as shown in FIG. 4. The permissions are presented as user-level permissions converted from the application-level permissions using a permission mapping table. The permission mapping table maps an application-level permission to one or more user-level permissions and one or more OS-level permissions, or vice versa. At block 603, a security profile is generated based on the user's response granting all of the required permissions, as well as none, some, or all of the optional permissions. The security profile includes information identifying one or more OS-level permissions that are converted from the presented user-level permissions using the permission mapping table. At block 604, the security profile is enforced to restrict the application accessing the one or more resources based on the granted permissions.

Figure 7:
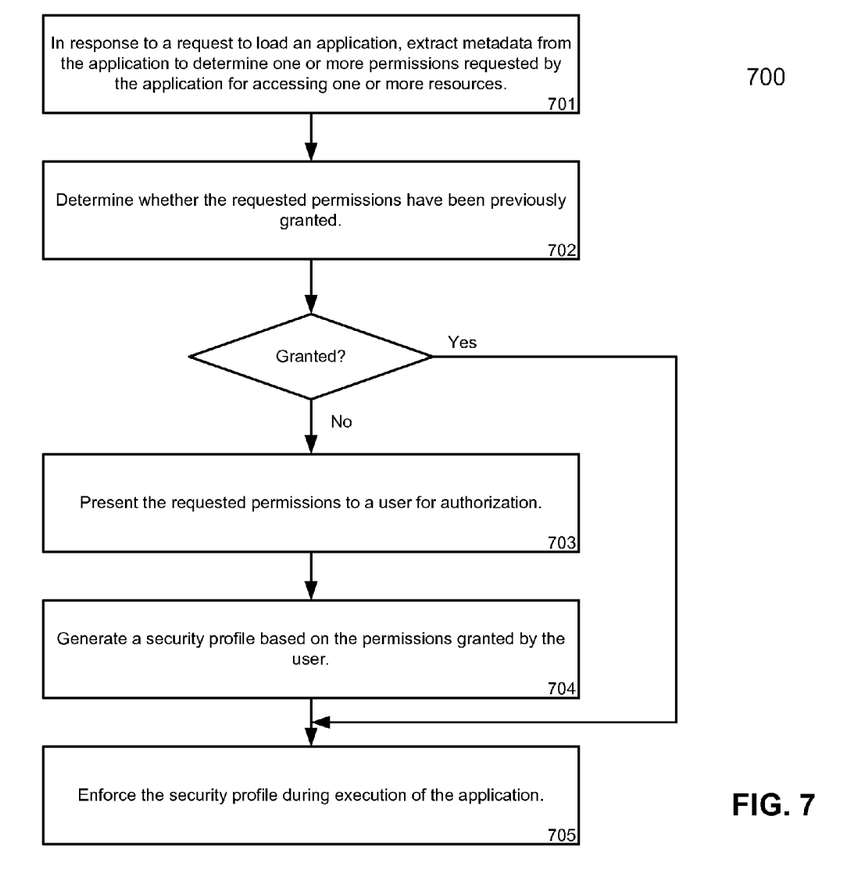
FIG. 7 is a flow diagram illustrating a method for granting permissions of an application according to another embodiment of the invention.

FIG. 7 is a flow diagram illustrating a method for granting permissions of an application according to another embodiment of the invention. Method 700 may be performed by security framework 103 of FIG. 1. Referring to FIG. 7, in response to a request to load an application, at block 701, metadata is extracted from the application to determine zero or more permissions requested by the application for accessing zero or more resources. Resources may represent a file, a directory, an email, a network connection, a peripheral device, a GUI or window, an interface device, etc. At block 702, it is determined whether the requested permissions have been previously granted during a previous execution of the application. Such a determination may be performed by comparing the requested permissions with permissions listed in a security profile associated with the application. The security profile may have been created and stored in a persistent storage during a previous execution of the application.

If the request permissions have been previously granted based on the security profile, at block 705, the same permissions are enforced based on the security profile during execution of the current instance of the application, without a need to prompt a user for authorizing the requested permissions. If the requested permissions have not been previously granted (e.g., the currently requested permission(s) are not listed in the security profile or listed but not granted in the security profile), at block 703, the requested permissions are presented to a user for authorization, for example, using a permission mapping module such as that illustrated in block 110 in FIG. 1, and GUI similar to the one as shown in FIG. 4. At block 704, a new security profile is generated based on the user input. Alternatively, an existing security profile may be updated based on the user input. At block 705, the security profile is enforced.

Figure 8:
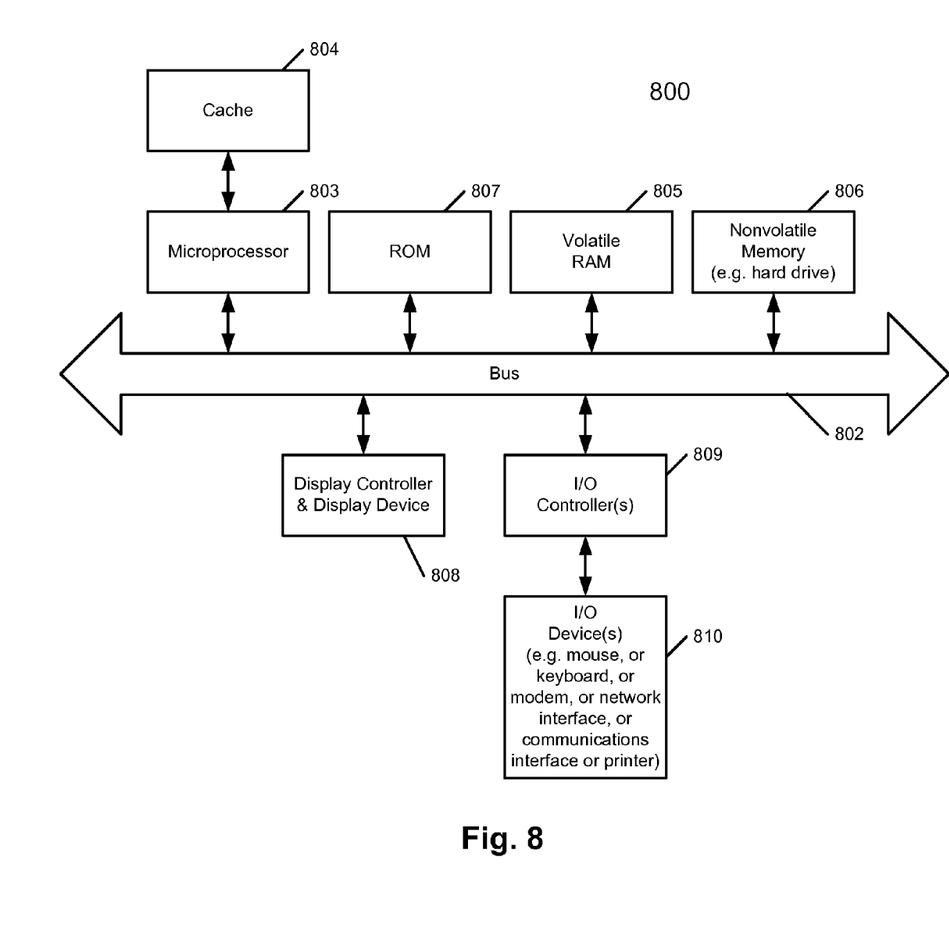
FIG. 8 is a block diagram of a data processing system, which may be used with one embodiment of the invention.

FIG. 8 is a block diagram of a data processing system, which may be used with one embodiment of the invention. For example, the system 800 may be used as part of system 100 as shown in FIG. 1. Note that while FIG. 8 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 8 may, for example, be an Apple Macintosh computer or MacBook, an IBM compatible PC, a device such as an iPhone or iPad, or a computer server.

As shown in FIG. 8, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
determining one or more application-level permissions requested from an application for accessing one or more resources, wherein the one or more resources are a subset of a plurality of resources associated with execution of the application;
translating the one or more application-level permissions to one or more user-comprehensible functions based on a first permission mapping table that maps each of the one or more application-level permissions to at least one of the one or more user-comprehensible functions;
presenting in a user interface the one or more user-comprehensible functions in a user understandable language or mode of expression, wherein the one or more user-comprehensible functions represent the one or more application-level permissions requested from the application for accessing the one or more resources;
receiving an input corresponding to a user interacting with the user interface;
determining, based on the received input, that the user has authorized at least one of the user-comprehensible functions presented in the user interface;
converting the one or more application-level permissions into one or more operating system (OS)-level permissions based on a second permission mapping table that maps each of the one or more application-level permissions to at least one of the one or more OS-level permissions;
generating a security profile having the one or more OS-level permissions, wherein the security profile is generated based on the at least one of the user-comprehensible functions authorized by the user; and
enforcing the security profile to restrict the application to accessing the one or more resources based on the one or more OS-level permissions.

2. The method of claim 1, further comprising extracting metadata from the application to dynamically determine the one or more application-level permissions that are requested by the application.

3. The method of claim 1, further comprising identifying a first set of the application-level permissions that is required by the application and a second set of the application-level permissions that is optionally required by the application.

4. The method of claim 3, further comprising:
presenting in the user interface a first user-comprehensible function block representing the first set of the application-level permissions indicating that the first user-comprehensible function block is required by the application; and
presenting in the user interface a second user-comprehensible function block representing the second set of the application-level permissions indicating that the second user-comprehensible function block is optional, wherein zero or more of the functions from the second user-comprehensible function block are selectable to be granted to the application.

5. The method of claim 4, further comprising:
preventing the application from being loaded if the first user-comprehensible function block is denied by the user; and
preventing the application from accessing a resource associated with an optional function of the second user-comprehensible function block if the optional function of the second user-comprehensible function block is denied by the user, while allowing the application to be executed.

6. The method of claim 1, wherein the application is an applet, plug-in, or other loadable code module hosted by a host application, and wherein permissions granted to the applet, plug-in, or other loadable code modules do not exceed permissions entitled by the host application.

7. A non-transitory computer-readable storage medium having instructions stored therein, which when executed by a computer, cause the computer to perform a method, the method comprising:
determining one or more application-level permissions requested from an application for accessing one or more resources, wherein the one or more resources are a subset of a plurality of resources associated with execution of the application;

translating the one or more application-level permissions to one or more user-comprehensible functions based on a first permission mapping table that maps each of the one or more application-level permissions to at least one of the one or more user-comprehensible functions;

presenting in a user interface the one or more user-comprehensible functions in a user understandable language or mode of expression, wherein the one or more user-comprehensible functions represent the one or more application-level permissions requested from the application for accessing the one or more resources;

receiving an input corresponding to a user interacting with the user interface;

determining, based on the received input, that the user has authorized at least one of the user-comprehensible functions presented in the user interface;

converting the one or more application-level permissions into one or more operating system (OS)-level permissions based on a second permission mapping table that maps each of the one or more application-level permissions to at least one of the one or more OS-level permissions;

generating a security profile having the one or more OS-level permissions, wherein the security profile is generated based on the at least one of the user-comprehensible functions authorized by the user; and enforcing the security profile to restrict the application to accessing the one or more resources based on the one or more OS-level permissions.

8. The computer-readable storage medium of claim 7, wherein the method further comprises extracting metadata from the application to dynamically determine the one or more application-level permissions that are requested by the application.

9. The computer-readable storage medium of claim 7, wherein the method further comprises identifying a first set of the application-level permissions that is required by the application and a second set of the application-level permissions that is optionally required by the application.

10. The computer-readable storage medium of claim 9, wherein the method further comprises:

presenting in the user interface a first user-comprehensible function block representing the first set of the application-level permissions indicating that the first user-comprehensible function block is required by the application; and presenting in the user interface a second user-comprehensible function block representing the second set of the application-level permissions indicating that the second user-comprehensible function block is optional, wherein zero or more of the functions from the second user-comprehensible function block are selectable to be granted to the application.

11. The computer-readable storage medium of claim 10, wherein the method further comprises:

preventing the application from being loaded if the first user-comprehensible function block is denied by the user; and preventing the application from accessing a resource associated with an optional function of the second user-comprehensible function block if the optional function of the second user-comprehensible function block is denied by the user, while allowing the application to be executed.

12. The computer-readable storage medium of claim 7, wherein the application is an applet, plug-in, or other loadable code module hosted by a host application and wherein permissions granted to the applet, plug-in, or other loadable code module do not exceed permissions entitled by the host application.

13. A data processing system, comprising:

a processor; and a memory coupled to the processor to store instructions, which when executed from the memory, cause the processor to determine one or more application-level permissions requested from an application for accessing one or more resources, wherein the one or more resources are a subset of a plurality of resources associated with execution of the application, translate the one or more application-level permissions to one or more user-comprehensible functions based on a first permission mapping table that maps each of the one or more application-level permissions to at least one of the one or more user-comprehensible functions, present in a user interface the one or more user-comprehensible functions in a human understandable language or mode of expression, wherein the one or more user-comprehensible functions represent the one or more application-level permissions requested from the application for accessing the one or more resources, receive an input corresponding to a user interacting with the user interface, determine, based on the received input, that the user has authorized at least one of the user-comprehensible functions presented in the user interface, convert the one or more application-level permissions into one or more operating system (OS)-level permissions based on a second permission mapping table that maps each of the one or more application-level permissions to at least one of the one or more OS-level permissions, generate a security profile having the one or more OS-level permissions, wherein the security profile is generated based on the at least one of the user-comprehensible functions authorized by the user, and enforce the security profile to restrict the application to accessing the one or more resources based on the one or more OS-level permissions.

14. A computer-implemented method, comprising:

determining one or more permissions based on metadata extracted from an application in response to a request to load the application, the permissions being requested by the application for accessing one or more resources;

translating the one or more permissions to user-comprehensible functions based on a first permission mapping table that maps each of the one or more permissions to at least one of the user-comprehensible functions;

presenting the one or more permissions to a user including a first set of the permissions that is required by the application and a second set of the permissions that is optionally required, wherein zero or more of the permissions from the second permission set are selectable by the user;

converting the one or more permissions to operating system (OS)-level permissions based on a second permission mapping table that maps each of the one or more permissions to at least one of the OS-level permissions;

generating a security profile for the application based on a user input granting at least one of the presented one or more permissions; and enforcing the security profile to restrict the application to accessing one or more resources permitted by the at least one granted permission, wherein the one or more permissions are described as application-level permissions using a programming language compatible with the application, wherein the first and second sets of permissions are presented as user-comprehensible functions described in a human understandable language or expression, and wherein the security profile includes one or more OS-level permissions corresponding to the at least one granted user-comprehensible function.

15. The method of claim 14, further comprising:

prompting the user whether the security profile should be stored in a persistent storage for subsequent loading of the application; and storing the security profile in the persistent storage in response to the user input.

16. The method of claim 15, further comprising:

in response to a second request for loading the application, examining the security profile to determine whether a permission requested by the application has been granted in a previous execution of the application;

prompting a user for authorizing the permission requested by the application if the requested permission has not been granted previously as specified in the security profile; and loading the application without prompting the user if the same or greater requested permission has been previously granted based on the security profile.

* * * * *